US009415710B2

(12) United States Patent
Simon et al.

(10) Patent No.: US 9,415,710 B2
(45) Date of Patent: Aug. 16, 2016

(54) CONSOLE ARMREST ASSEMBLY WITH DAMPENING STRUT AND INTEGRATED INERTIAL LOCK

(71) Applicant: FORD GLOBAL TECHNOLOGIES, LLC, Dearborn, MI (US)

(72) Inventors: Scott Simon, Dexter, MI (US); Christopher Emery Fesenmyer, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/560,618

(22) Filed: Dec. 4, 2014

(65) Prior Publication Data

US 2016/0159258 A1 Jun. 9, 2016

(51) Int. Cl.
 *B60N 2/46* (2006.01)
 *B60R 7/04* (2006.01)

(52) U.S. Cl.
 CPC ............ *B60N 2/4686* (2013.01); *B60N 2/4606* (2013.01); *B60R 7/04* (2013.01)

(58) Field of Classification Search
 CPC ...... B60N 2/46; B60N 2/4606; B60N 2/4626; B60N 2/4633; B60N 2/4686; B60R 7/04
 USPC .......... 296/1.09, 24.34, 24.46, 37.8; 297/115, 297/188.14, 411.2, 411.21
 See application file for complete search history.

(56) References Cited

U.S. PATENT DOCUMENTS

| 3,563,604 | A | 2/1971 | Barecki |
| 5,476,307 | A | 12/1995 | Whalen |
| 5,540,479 | A | 7/1996 | Thomas et al. |
| 6,010,193 | A | 1/2000 | Hara et al. |
| 6,802,550 | B1 * | 10/2004 | Griggs, Jr. ........... B60N 2/4686 292/136 |
| 7,163,248 | B2 * | 1/2007 | Adams ..................... B60R 7/04 296/24.34 |
| 7,726,745 | B2 | 6/2010 | Bruns et al. |
| 2003/0020310 | A1 | 1/2003 | Stumpf et al. |
| 2014/0003864 | A1 | 1/2014 | Gillis et al. |

FOREIGN PATENT DOCUMENTS

| DE | 3825781 A1 | 2/1990 |
| DE | 102005006977 A1 | 8/2006 |
| WO | 0121043 A1 | 3/2001 |
| WO | 2007132216 A1 | 11/2007 |

OTHER PUBLICATIONS

English machine translation of DE102005006977.
English machine translation of DE3825781.
"More Care, Built In"; Plant & Equipment; Coal International Mar./Apr. 2014; pp. 68-69.

* cited by examiner

*Primary Examiner* — Jason S Daniels
(74) *Attorney, Agent, or Firm* — Vichit Chea; King & Schickli, PLLC (57) ABSTRACT

A console armrest assembly includes a support, a displaceable cover and a hinge pivotally attaching that cover to the support. A dampening strut is connected between the hinge and the support. Further, a detent mechanism is carried on the strut and a support for holding the cover in a closed position.

13 Claims, 9 Drawing Sheets

CONSOLE ARMREST ASSEMBLY WITH DAMPENING STRUT AND INTEGRATED INERTIAL LOCK

TECHNICAL FIELD

This document relates generally to the vehicle equipment field and, more particularly, to a console armrest assembly incorporating a dampening strut and an integrated inertial lock.

BACKGROUND

Figure 1:
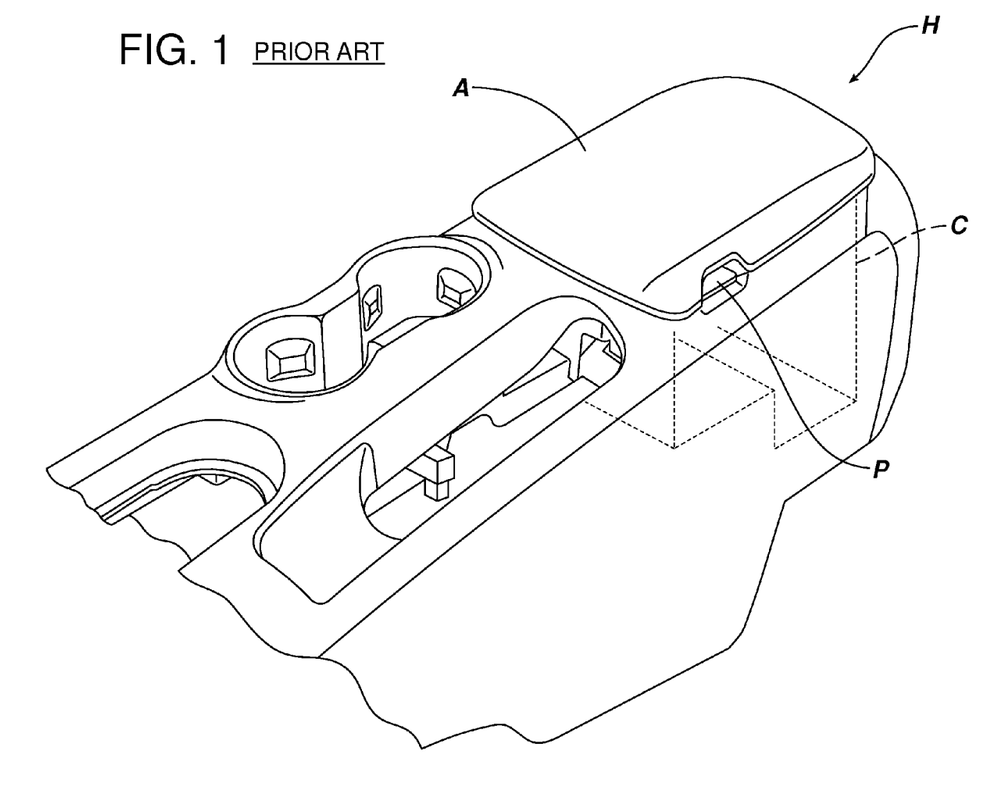
FIG. 1 is a perspective view of a prior art console armrest assembly including traditional paddle actuators for unlatching the hinged cover/armrest.

It is very desirable to provide center console storage in a motor vehicle. As illustrated in FIG. 1, in the past the storage has often consisted of an enclosed compartment C housed in the console housing H. Access to that compartment is controlled by a hinged cover in the form of an armrest A. A latch secures the armrest in the closed position. A paddle actuator P may be provided at each side of the armrest A to allow one to unlock the latch, pivot the armrest open and access the storage compartment.

While center console storage is a very useful and convenient interior feature, it should be appreciated that the latch and latch actuator mechanisms on the cover/armrest A include a number of moving parts that add to production costs and also have substantial space requirements that reduce the usable storage space in the console housing. Further, it should be appreciated that such latches may not always provide desired high integrity inertial locking to maintain the cover/armrest A closed in response to an event such as a high-G force accident.

This document relates to a new and improved console armrest assembly incorporating a dampening strut to provide desired dampening of the movement of the armrest cover as it is opened and closed, a detent mechanism providing a passive latch for holding the armrest in the closed position during normal vehicle operation and a separate inertial lock for securing the cover/armrest in the closed position in response to a high-G force condition. Significantly, the console armrest assembly described herein does not incorporate a traditional latch and latch actuator structure. Advantageously, elimination of a traditional latch and associated latch actuator preserves more space and allows the provision of a storage compartment with a larger volume. In addition this console armrest assembly has fewer parts and is generally less expensive to produce.

SUMMARY

In accordance with the purposes and benefits described herein, a console armrest assembly is provided. That assembly comprises a support, a cover displaceable between an open position and a closed position, a hinge pivotally attaching the cover to the support and a dampening strut connected between the hinge and the support. Further, the assembly includes a detent mechanism carried on the strut and the support for holding or retaining the cover in the closed position.

In one possible embodiment the detent mechanism includes a detent and a retainer. The detent is carried on the strut. The retainer is a leaf spring that is carried on the support. That leaf spring includes a distal end having a first cam surface projecting toward the detent. The detent has a second cooperating cam surface that wipes the first cam surface when the cover is displaced between the open and closed positions.

In another possible embodiment, the console armrest assembly includes an inertial lock for securing the cover in the closed position in response to a high-G force condition. The inertial lock includes a pivoting catch and a cooperating latching lug. The catch is displaceable between a home position and a deployed position and a biasing element is provided to bias the catch into the home position.

In one possible embodiment, the leaf spring of the detent mechanism is carried on a mounting plate that is attached to the support. The catch is carried on the strut and a cooperating inertial latching lug is a flange on the mounting plate.

In one possible embodiment, the mounting plate includes a base section, a first arm, a second arm and a slot between the first and second arms. The first arm carries the latch and the second arm carries the inertial latching lug. A fastener secures one end of the strut and the mounting plate to the support.

In accordance with an additional aspect, a console armrest assembly is provided that includes a cover displaceable between open and closed positions, a hinge pivotally attaching the cover to a support, a dampening strut connected between the hinge and the support and an inertial lock for securing the cover in the closed position in response to a high-G force condition wherein the inertial lock includes a catch and a latching lug. A vehicle incorporating the console armrest assembly is also provided.

In the following description, there are shown and described several preferred embodiments of the console armrest assembly. As it should be realized, the assembly is capable of other, different embodiments and its several details are capable of modification in various, obvious aspects all without departing from the assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the console armrest assembly and together with the description serve to explain certain principles thereof. In the drawing figures:

FIG. 2b is a front elevational view of the console armrest assembly illustrated in FIG. 2a.

Reference will now be made in detail to the present preferred embodiments of the console armrest assembly, examples of which are illustrated in the accompanying drawing figures.

DETAILED DESCRIPTION

Reference is now made to FIGS. 2a-5c illustrating the console armrest assembly 10 for covering a storage compartment in a center console of a motor vehicle. That assembly includes a support in the form of two cooperating support frames 12, 14 that secure the assembly to the vehicle. A cover 16 is pivotally connected by the hinges 18 to the two support frames 12, 14 by associated pivot pins 19. As will be described in greater detail below, the cover 16, which may take the form of an armrest, is selectively displaceable between an open position (see FIG. 3a), allowing access to the storage compartment in the center console, and a closed position (see FIGS. 2a and 2b) wherein the cover closes off the access opening to that storage compartment.

A dampening strut 22 is connected between one hinge 18 and the support frame 14. In the illustrated embodiment the cylinder body 24 of the dampening strut 22 is secured at one end to the hinge 18 by means of the fastener 26 while the strut rod end 28 is secured to the support frame 14 by means of the fastener 30.

Figure 2A:
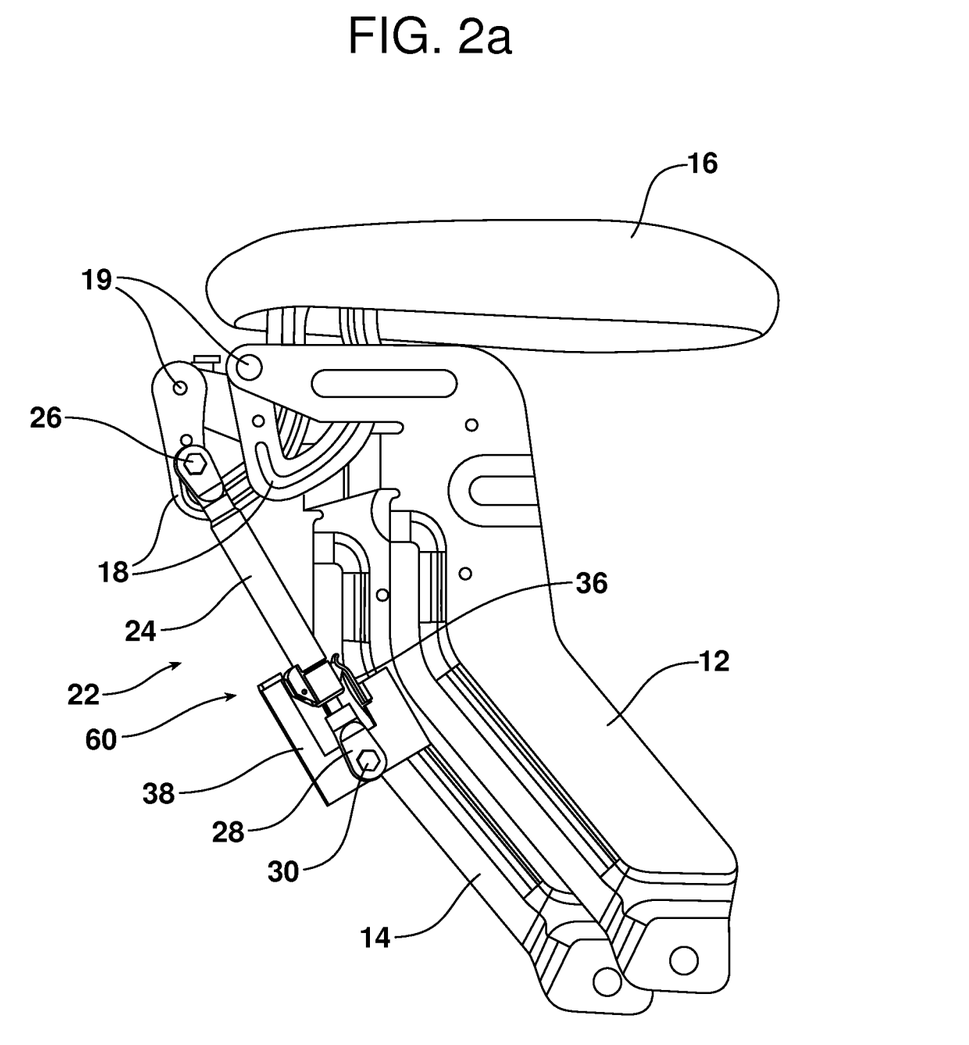
FIG. 2a is a perspective view of the current console armrest assembly with the armrest pivoted into the closed position.
Figure 2B:
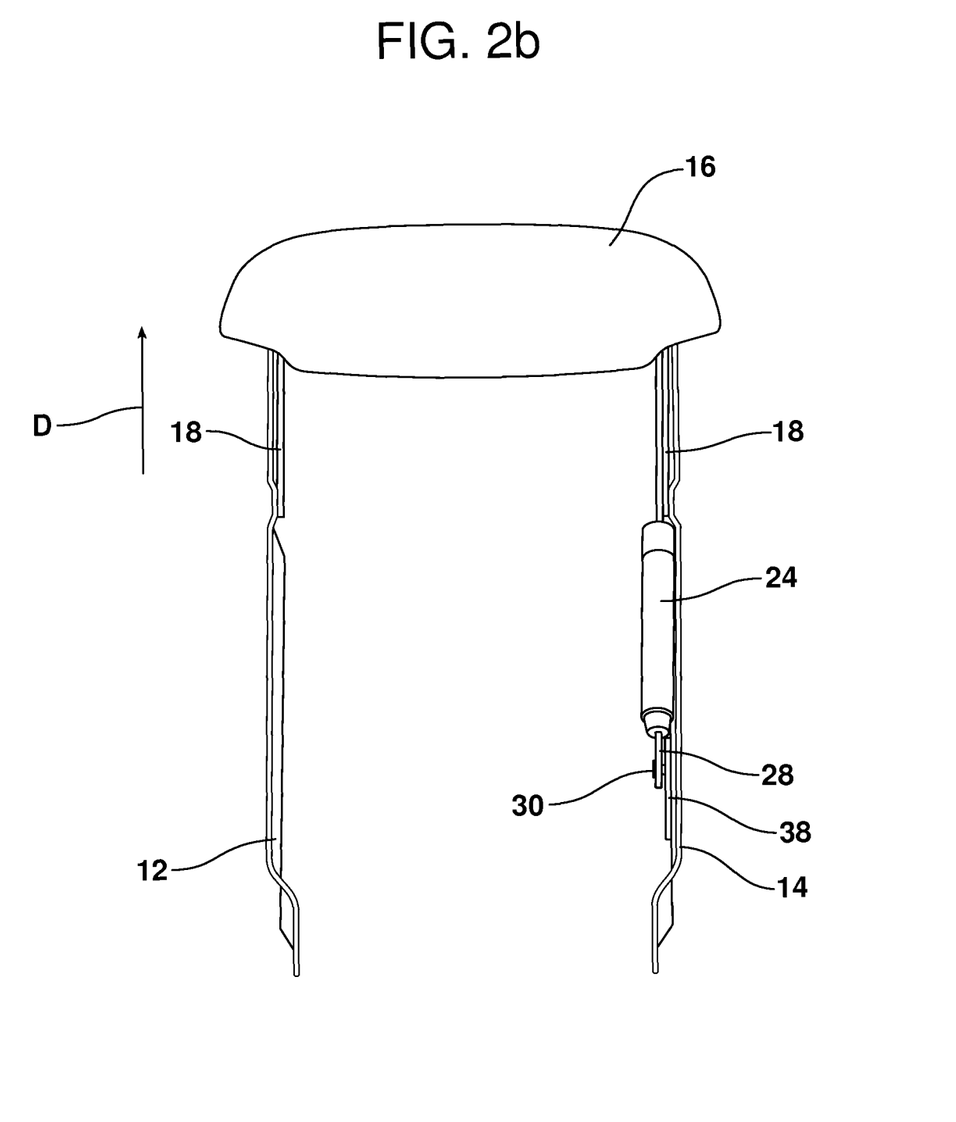
Figure 2C:
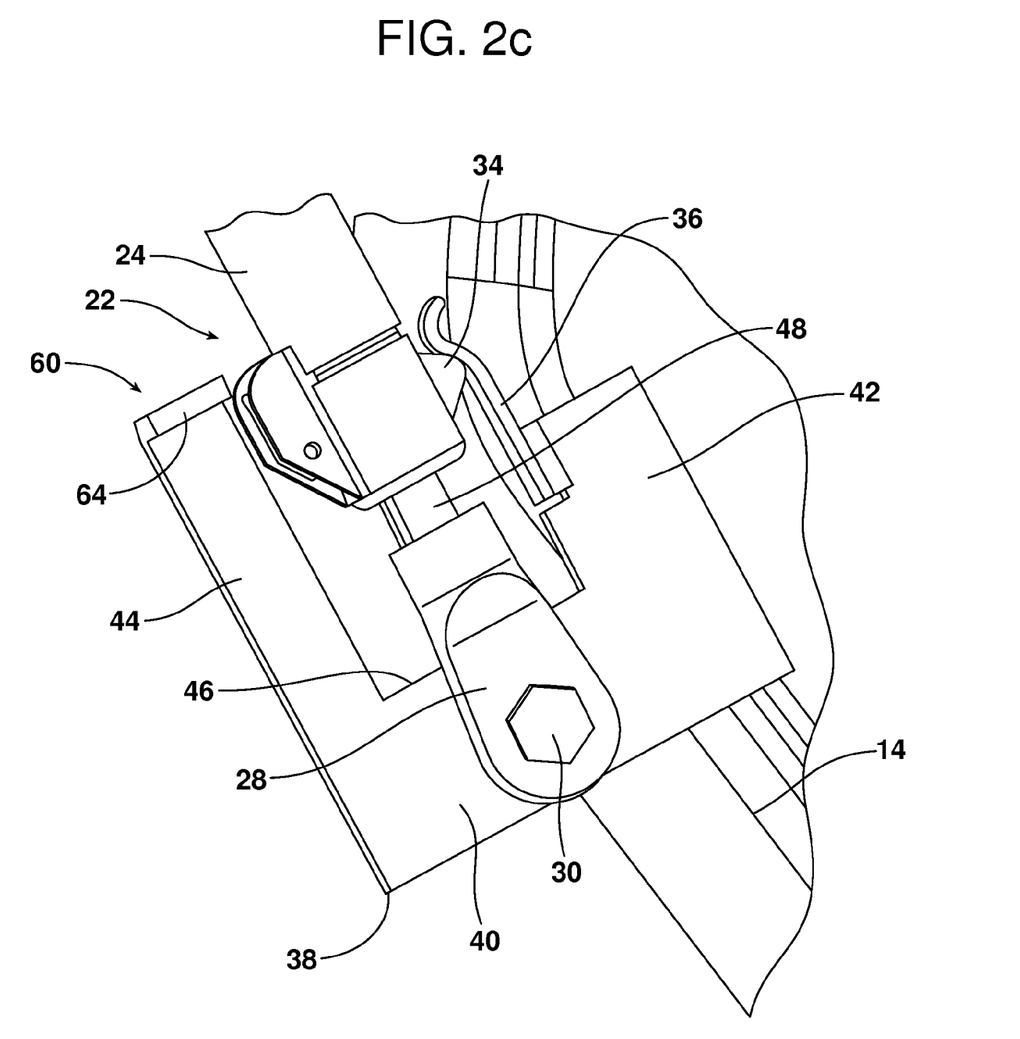
FIG. 2c is a detailed perspective view illustrating the detent mechanism and inertial lock of the console armrest assembly wherein the detent mechanism is engaged to hold the cover in the closed position and the inertial lock is in the home position.
Figure 3A:
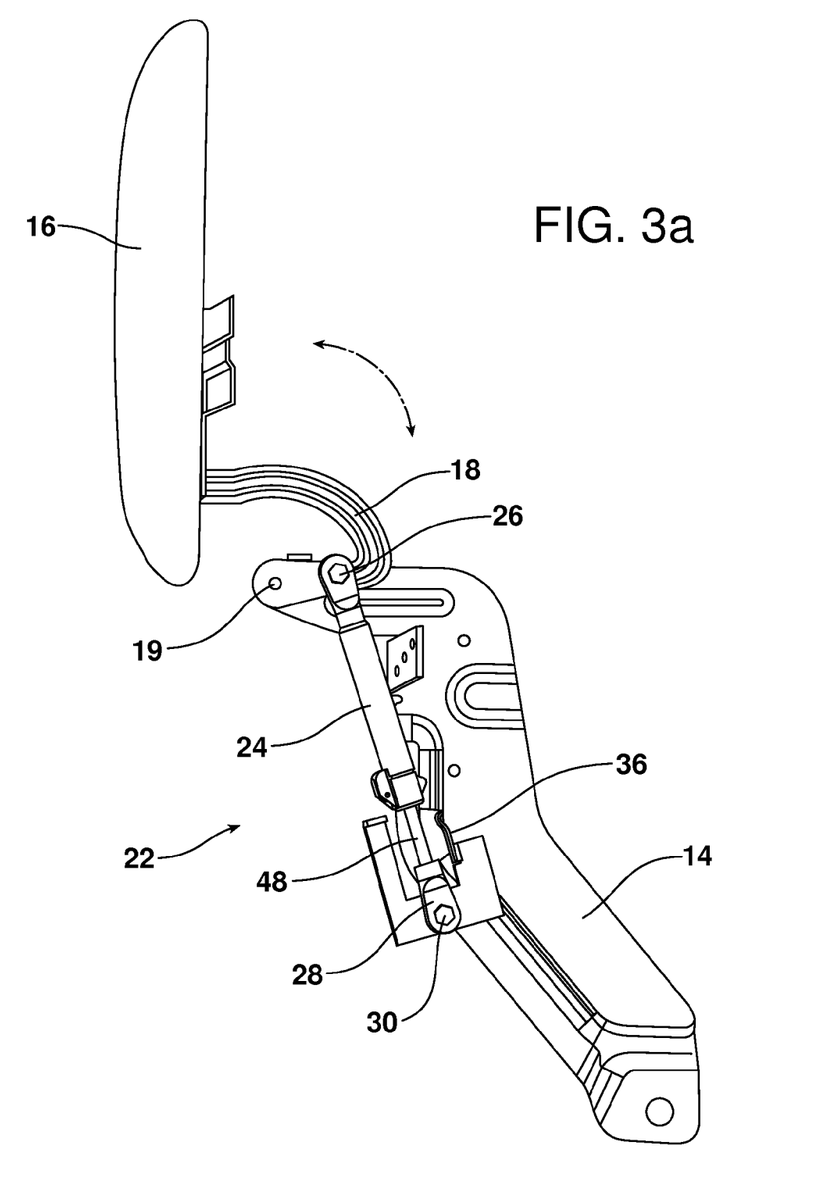
FIG. 3a is a side elevational view showing the cover in the open position.
Figure 3B:
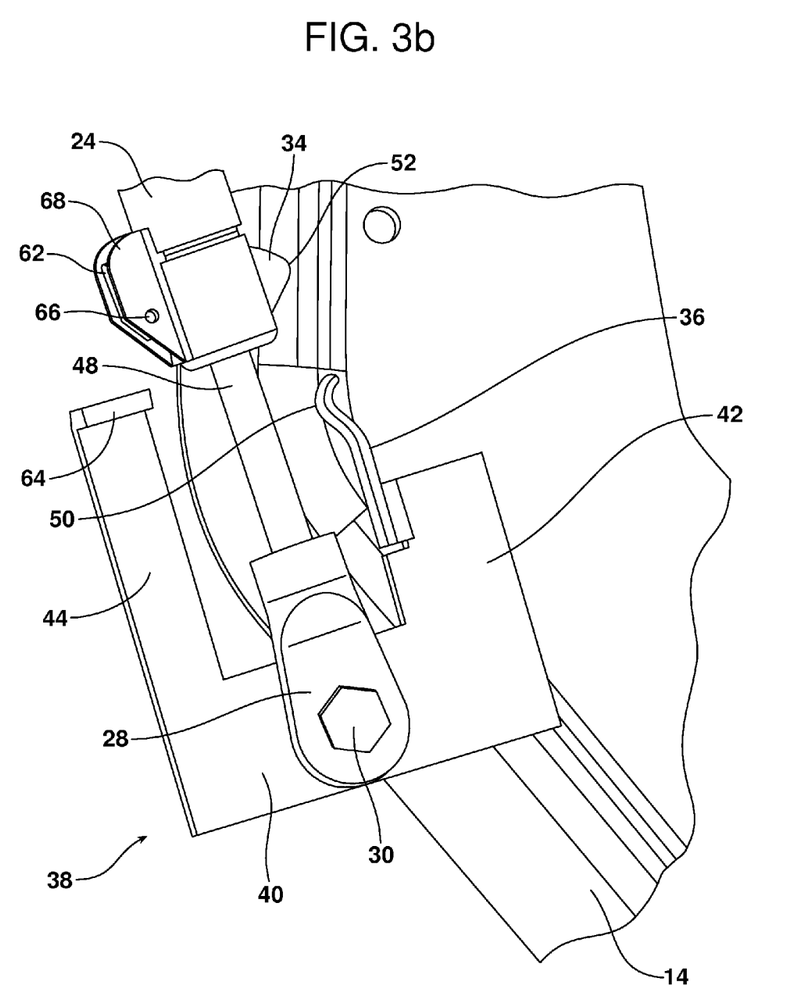
FIG. 3b is a detailed perspective view of the detent mechanism and inertial lock showing the detent mechanism disengaged when the cover is in the open position.
Figure 4:
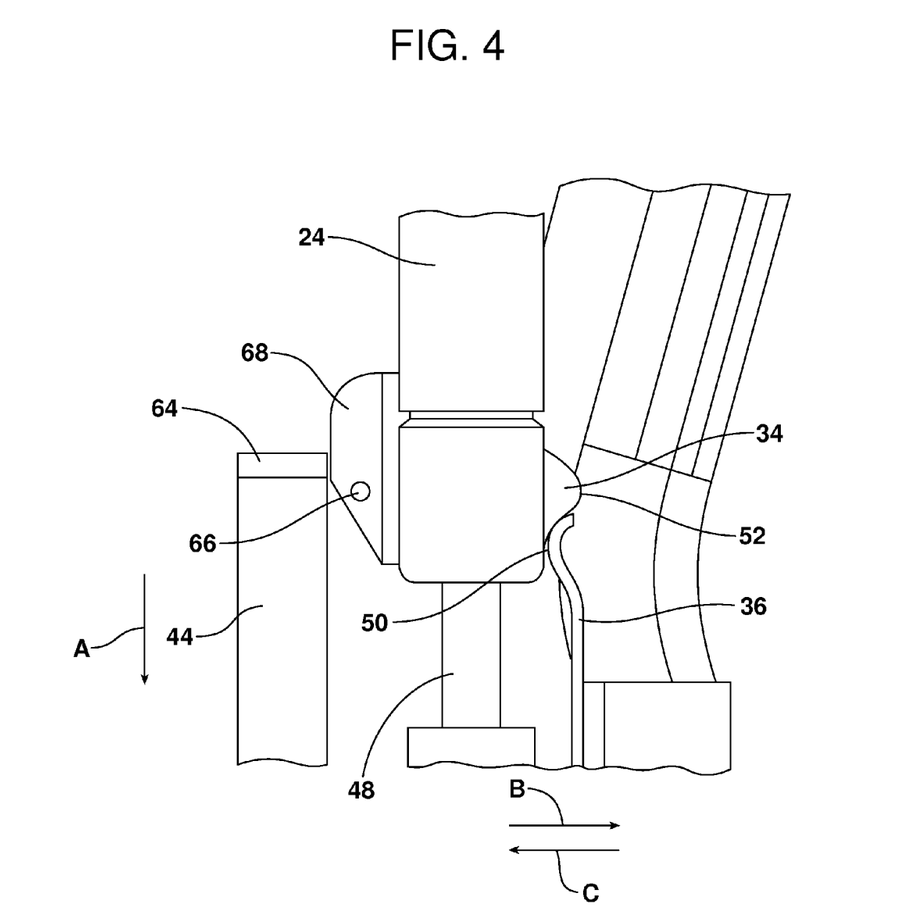
FIG. 4 is a side elevational view illustrating how the cooperating cam surfaces of the detent and the retaining spring wipe across one another as the cover is displaced between the open and closed positions.

As best illustrated in FIGS. 2c, 3b and 4, a detent mechanism, generally designated by reference numeral 32, includes a lug or detent 34 carried on the cylinder body 24 of the strut 22 and a retainer in the form of a leaf spring 36 carried on the support frame 14. More particularly, the assembly 10 includes a mounting plate 38 having a base section 40, a first arm 42 and a second arm 44. A slot 46 is provided between the first and second arms 42, 44. As illustrated, the fastener 30 that secures the strut end 28 to the support frame 14 also secures the mounting plate 38 to that support frame through an aperture provided in the base section 40. As illustrated in FIG. 2c, the slot 46 provides the necessary clearance between the first and second arms 42, 44 of the mounting plate 38 to receive the cylinder body 24 of the dampening strut 22 when the cover 16 is in the closed position and the strut rod 48 is fully retracted inside the cylinder body. Such a construction is compact and preserves space for a larger volume storage compartment.

As best illustrated in FIG. 3b, the leaf spring 36 includes a first cam surface 50 at its distal end that projects toward the detent 34. A second, cooperating cam surface 52 is provided on the detent 34. As illustrated in FIG. 4, when the cover 16 is displaced from the open position to the closed position, the cylinder body 24 slides along the strut rod 48 in the direction of action arrow A causing the two cooperating curved cam surfaces 50, 52 of the leaf spring 36 and detent 34 to wipe together. As a result, the leaf spring 36 rides up and over the cam surface 52 of the detent 34 by first moving in the direction of action arrow B. After traveling over center, the leaf spring 36 moves in the direction of action arrow C and the peak of the cam surface 52 is captured below the peak of the cam surface 50 on the leaf spring 36 so that the detent mechanism 32 functions to retain the cover in the closed position (see FIG. 2c).

When the cover 16 is to be opened, an operator pulls the cover upwardly from the console in the direction of action arrow D in FIG. 2b and the cam surfaces 50, 52 of the leaf spring 36 and detent 34 again wipe past each as the cylinder body 24 moves in the direction of action arrow D (note FIG. 4) along the strut rod 48 until the cover is in the fully open position. Here it should be noted that the dampening strut 22 provides desired damping when the cover 16 is moved in either direction thereby allowing smooth and consistent operation with a high-quality feel. It should also be appreciated that the dampening strut 22 and the detent mechanism 32, including particularly the biasing force of the leaf spring 36, function together to prevent any vibration, rattling and noise when the cover 16 is in the closed position.

Figure 5A:
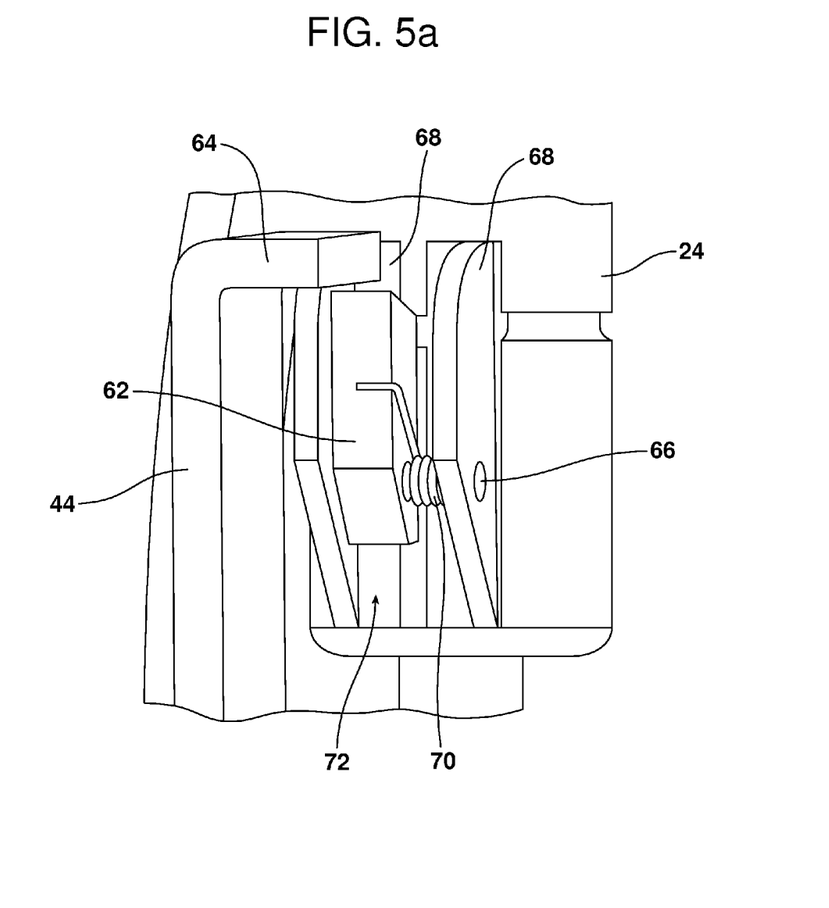
FIGS. 5a-5c are detailed perspective illustrations of the inertial lock with FIGS. 5a and 5b showing the catch of the inertial lock in the home position and FIG. 5c showing the catch of inertial lock displaced into the deployed position such as occurs when subjected to a high-G force.
Figure 5B:
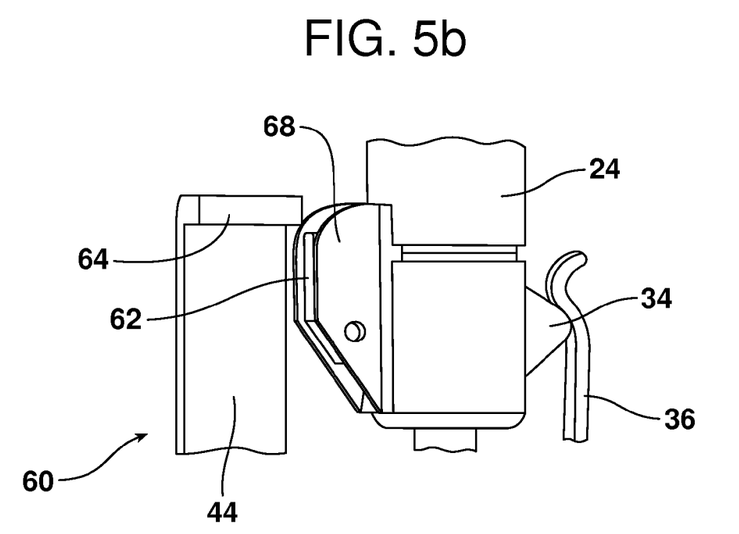
Figure 5C:
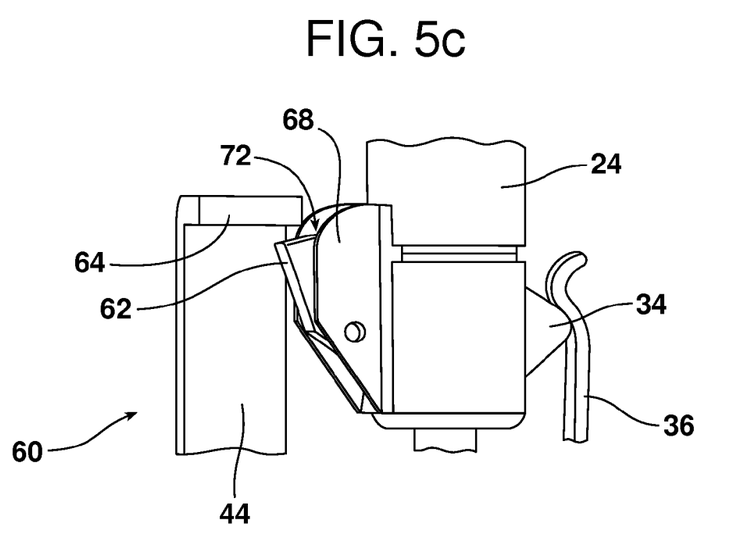

As further illustrated in FIGS. 2a, 2c, 3b and 5a-5c, the assembly 10 also includes an inertial lock generally designated by reference numeral 60. The inertial lock 60 functions to secure the cover 16 in the closed position in response to a high-G force condition such as may be experienced in a rear end collision. More specifically, the inertial lock 60 includes a pivoting catch 62 and a cooperating latching lug 64. The pivoting catch 62 is pivotally mounted to the cylinder body 24 of the dampening strut 22 by means of a pivot pin 66 received in cooperating apertures in the pivoting catch and the two mounting brackets 68 secured to the cylinder body 24. As best illustrated in FIG. 5a, a torsion spring 70 received over the pivot pin 66 biases the pivoting catch 62 into a home position wherein the catch is held in the channel 72 defined between the two mounting brackets 68. The latching lug 64 in the illustrated embodiment is a flange at the end of the second arm 44 of the mounting plate 38.

During normal operation, the torsion spring 70 retains the pivoting catch 62 within the channel 72 where it is clear of and remains out of contact with the latching lug 64 as the cover is opened and closed. In contrast, when subjected to a high-G force event of sufficient magnitude, the biasing force of the torsion spring 70 is overcome and the pivoting catch 62 is displaced from the home position within the channel 72 to the deployed position projecting from the channel (note home position illustrated in FIG. 5b and deployed position illustrated in FIG. 5c). As should be appreciated, in the deployed position, the pivoting catch 62 engages the latching lug 64 thereby preventing the cylinder body 24 from sliding upwardly along the strut rod 48 (note action arrow E in FIG. 5c) and thus, preventing the cover 16 from opening due to the force of the collision. At all other times, the torsion spring 70 maintains the pivoting catch 62 in the home position within the channel 72 so as to provide the necessary clearance to allow free movement of the cover 16 between the open and closed positions (see FIG. 5b).

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. A console armrest assembly comprising:
a support;
a cover displaceable between an open position and a closed position;
a hinge pivotally attaching said cover to said support;
a dampening strut connected between said hinge and said support;
a detent carried on said strut and a leaf spring retainer carried on said support for holding said cover in said closed position, said leaf spring retainer including a distal end having a first cam surface projecting toward said detent.

2. The assembly of claim 1, wherein said detent has a second cooperating cam surface that wipes said first cam surface when said cover is displaced between said open and closed positions.

3. The assembly of claim 2, further including an inertial lock for securing said cover in said closed position in response to a high-G force condition.

4. The assembly of claim 3, wherein said inertial lock includes a pivoting catch and a cooperating latching lug.

5. The assembly of claim 4, wherein said catch is displaceable between a home position and a deployed position and a biasing element is provided to bias said catch into the home position.

6. The assembly of claim 5, wherein (a) said leaf spring retainer is carried on a mounting plate attached to said support, (b) said catch is carried on said strut and (c) said cooperating inertial latching lug is a flange on said mounting plate.

7. The assembly of claim 6, wherein said mounting plate includes a base section, a first arm, a second arm and a slot between said first and second arms.

8. The assembly of claim 7, wherein said first arm carries said leaf spring retainer and said second arm carries said inertial latching lug.

9. The assembly of claim 8, wherein a fastener secures one end of said strut and said mounting plate to said support.

10. The assembly of claim 1, wherein said assembly further includes an inertial lock for securing said cover in said closed position in response to a high-G force condition.

11. The assembly of claim 10, wherein said inertial lock comprises a catch pivotally connected to said strut and a latching lug carried on a mounting plate secured to said support.

12. The assembly of claim 11, wherein said catch is displaceable between a home position and a deployed position and a biasing element is provided to bias said catch into the home position.

13. A vehicle incorporating the console armrest assembly of claim 1.

\* \* \* \* \*